US009043077B2

(12) United States Patent
Doerr et al.

(10) Patent No.: US 9,043,077 B2
(45) Date of Patent: May 26, 2015

(54) METHOD AND DEVICE FOR DETERMINING A TYPE OF AN IMPACT OF AN OBJECT ON A VEHICLE

(75) Inventors: Alfons Doerr, Stuttgart (DE); Christian Korn, Stuttgart (DE); Stephan Rittler, Urbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 220 days.

(21) Appl. No.: 13/642,097

(22) PCT Filed: Apr. 14, 2011

(86) PCT No.: PCT/EP2011/055913
§ 371 (c)(1),
(2), (4) Date: Dec. 26, 2012

(87) PCT Pub. No.: WO2011/131558
PCT Pub. Date: Oct. 27, 2011

(65) Prior Publication Data
US 2013/0124035 A1 May 16, 2013

(30) Foreign Application Priority Data
Apr. 20, 2010 (DE) .......................... 10 2010 027 969

(51) Int. Cl.
*B60R 21/0132* (2006.01)
*B60R 21/00* (2006.01)

(52) U.S. Cl.
CPC ..... *B60R 21/0132* (2013.01); *B60R 2021/0002* (2013.01); *B60R 2021/01322* (2013.01); *B60R 2021/01327* (2013.01)

(58) Field of Classification Search
CPC .. B60R 21/0132; B60R 21/01; B60R 21/013; B60R 2021/01–2021/01595
USPC ........................................ 701/32.2; 180/232
See application file for complete search history.

(56) References Cited

U.S. PATENT DOCUMENTS

| | | | |
|---|---|---|---|
| 6,390,498 B1 * | 5/2002 | Francis et al. ................ 280/735 |
| 6,564,132 B2 * | 5/2003 | Hackenberg ..................... 701/45 |
| 2002/0183962 A1 * | 12/2002 | Glaser et al. ..................... 702/151 |
| 2003/0182041 A1 * | 9/2003 | Watson ............................ 701/45 |
| 2006/0065050 A1 * | 3/2006 | Saito et al. ....................... 73/511 |
| 2007/0168098 A1 * | 7/2007 | Lich et al. ........................ 701/46 |
| 2011/0153164 A1 * | 6/2011 | Hiemer et al. .................. 701/45 |

FOREIGN PATENT DOCUMENTS

| | | |
|---|---|---|
| DE | 196 32 836 | 11/1997 |
| DE | 10 2008 001215 | 10/2009 |
| WO | WO 2005/030536 | 4/2005 |

* cited by examiner

*Primary Examiner* — Fadey Jabr
*Assistant Examiner* — Courtney Heinle
(74) *Attorney, Agent, or Firm* — Kenyon & Kenyon LLP (57) ABSTRACT

A method for determining a type of an impact of an object on a vehicle includes: reading in an acceleration value; determining a transverse acceleration value that represents a difference between the lateral acceleration value and an acceleration value based on the rotational acceleration value, for an acceleration transverse to the longitudinal axis of the vehicle, and/or determining a longitudinal acceleration value that represents a difference between the longitudinal acceleration value and an acceleration value based on the rotational acceleration value, in the longitudinal direction of the vehicle; and recognition of the type of the impact if the transverse acceleration value and/or the longitudinal acceleration value stands in a predetermined relation to a respective threshold value.

11 Claims, 3 Drawing Sheets

METHOD AND DEVICE FOR DETERMINING A TYPE OF AN IMPACT OF AN OBJECT ON A VEHICLE

BACKGROUND OF THE INVENTION

1. Field of the Invention

The present invention relates to a method, a device, and a computer program product for determining a type of an impact of an object on a vehicle.

2. Description of the Related Art

Such algorithms for recognizing a vehicular accident, and the subsequent triggering of personal protective devices, make use of physical signals such as accelerations in the x direction (longitudinal direction of the vehicle, direction of travel), y direction (lateral direction of the vehicle, direction transverse to the direction of travel), or a yaw rate $\omega_z$. These signals are integrated or filtered in the respective parts of the algorithm as needed. These prepared signals are then further used in some further algorithm that may then result for example in a decision to trigger restraint devices for occupants of the vehicle.

In general, nowadays the movement of a vehicle in a crash (accident) is predominantly regarded as a linear movement. Here it is assumed that there take place exclusively a linear transfer of momentum (described by the determinable quantity dv) and a linear transmission of force (described by the measurable quantity a, acceleration). However, in the case of a crash what actually occur are combinations of rotational and linear movements.

Published German patent application document DE 10 2008 001215 A proposes a method for controlling at least one safety device that has a first step of acquisition of at least two features from at least one signal of an accident sensor system, in order to form a feature vector from the acquired features. Subsequently, in a second method step there follows a classification of the formed feature vector using a classifier based on statistical learning theory, in order to classify the feature vector in one of at least three possible feature classes. As a third method step, there is provided a controlling of the safety device corresponding to a controlling rule for the feature class in which the feature vector was classified.

BRIEF SUMMARY OF THE INVENTION

The present invention provides a method for determining a type of an impact of an object on a vehicle, the method having the following steps:

reading in of a rotational acceleration value, representing an acceleration of the vehicle about a vertical axis of the vehicle, of a longitudinal acceleration value of the vehicle, representing an acceleration in the direction of the longitudinal axis of the vehicle, and/or of a lateral acceleration value of the vehicle, representing an acceleration in the direction transverse to the longitudinal axis of the vehicle;

determining a transverse acceleration value, representing a difference between the lateral acceleration value and an acceleration value, based on the rotational acceleration value, for an acceleration transverse to the longitudinal axis of the vehicle, and/or determination of a longitudinal acceleration value, representing a difference between the longitudinal acceleration value and an acceleration value, based on the rotational acceleration value, in the longitudinal direction of the vehicle; and recognition of the type of impact, if the transverse acceleration value, or a transverse signal derived therefrom, stands in a predetermined relation to a first threshold value, and/or if the longitudinal acceleration value, or a longitudinal signal derived therefrom, stands in a predetermined relation to a second threshold value.

The present invention also creates a device for determining a type of an impact of an object on a vehicle, the device having the following features:

an interface for reading in a rotational acceleration value, representing an acceleration of the vehicle about a vertical axis of the vehicle, a longitudinal acceleration value of the vehicle, representing an acceleration in the direction of the longitudinal axis of the vehicle, and/or a lateral acceleration value of the vehicle, representing an acceleration in the direction transverse to the longitudinal axis of the vehicle;

a unit for determining a transverse acceleration value, representing a difference between the lateral acceleration value and an acceleration value, based on the rotational acceleration value, for an acceleration transverse to the longitudinal axis of the vehicle, and/or for determining a longitudinal acceleration value representing a difference between the longitudinal acceleration value and an acceleration value, based on the rotational acceleration value, in the longitudinal direction of the vehicle; and a unit for recognizing a predefined type of impact when the transverse acceleration value, or a transverse signal derived therefrom, stands in a predetermined relation to a first threshold value, and/or when the longitudinal acceleration value, or a longitudinal signal derived therefrom, stands in a predetermined relation to a second threshold value.

In addition, the present invention creates a control device that is fashioned to carry out or realized the steps of the method according to the present invention. In particular, the control device can have devices that are each fashioned in order to carry out a step of the method. The object of the present invention is also rapidly and efficiently achieved by this variant embodiment of the present invention in the form of a control device.

In the present context, the control device, or the device, may be understood as an electrical apparatus that processes sensor signals and outputs control signals as a function thereof. The control device can have an interface that can be fashioned as hardware and/or as software. In the case of a realization as hardware, the interfaces can for example be part of a so-called system ASIC containing a wide range of functions of the control device. However, it is also possible for the interfaces to be separate integrated circuits, or at least to be made up partly of discrete components. In the case of a realization as software, the interfaces can be software modules that are for example present on a microcontroller alongside other software modules.

Also advantageous is a computer program product having program code for carrying out the method in one of the above-described specific embodiments when the program is executed on a control device or some other apparatus. In particular, the computer program product can be stored on a machine-readable carrier such as a semiconductor storage device, a hard drive, or an optical storage device.

The present invention is based on the recognition that for the unambiguous recognition of a safety-relevant impact type, in addition to linear movement components rotational movement components should also be taken into account. The risk of injury to an occupant of the vehicle is sufficiently great only if a sufficient and lasting transfer of angular momentum and a torque, or transfer of momentum, and a sufficiently large force, occur due to the impact. In order to recognize such an impact type having a sufficiently high risk of injury to occupants of the vehicle, according to the approach presented here physical quantities such as rotational acceleration or a signal derived therefrom are linked with an acceleration in the direction of travel of the vehicle (longitudinal acceleration), and the signals obtained therefrom are compared to a first threshold value. In addition or alternatively, the rotational acceleration, or a signal derived therefrom, can be linked with an acceleration transverse to the direction of travel of the vehicle (lateral acceleration), and the signal obtained therefrom can be compared to a second threshold value. For the named linkages, in particular a difference formation is used to determine a deviation between a rotational behavior of the vehicle to be estimated from the rotational acceleration and an actual rotational behavior of the vehicle. Using different first and second threshold values allocated to different impact types, the actually occurring impact type can be determined.

In this context, an impact type can be understood as a collision situation in which an object having a particular size (in particular mass) strikes the vehicle at a particular location and/or at a particular angle. The impact results in different acceleration components in the travel direction and transverse to the travel direction of the vehicle. For the different impact types, it can for example be determined ahead of time which rotational acceleration would have to occur about a vertical vehicle axis in the case of such a collision scenario (impact). In order to determine the actual collision situation, the deviation can be determined between the actually measured accelerations (in the direction of travel and transverse to the direction of travel of the vehicle) and the predicted accelerations for this collision situation. The deviations between the actually measured accelerations and the predicted accelerations are typical for the different impact types (i.e. accident types), and therefore enable a classification of these impact types.

Therefore, in order to carry out the classification a first signal, based on the deviation between the actually measured acceleration in the direction of travel and an acceleration in the direction of travel that is predicted on the basis of the measured rotational acceleration, is compared to a first threshold value. Likewise, alternatively or in addition a second signal, based on the deviation between the actually measured acceleration transverse to the travel direction and an acceleration transverse to the direction of travel, predicted on the basis of the measured rotational acceleration, is compared to the second threshold value. If the first signal stands in a predetermined relation to the first threshold value (for example the first signal is smaller than the first threshold value), or the second signal stands in a predetermined relation to the second threshold value (for example the second signal is smaller than the second threshold value), the impact type can be recognized to which the respective first and/or second threshold value is allocated. In this case, it is for example recognized that the deviation between the predicted accelerations and the actually measured accelerations is small enough, relative to the predicted accelerations in the direction of travel or transverse to the direction of travel, that the corresponding impact type can be unambiguously assigned.

The present invention offers the advantage that, through a further use of signals already available in modern vehicles such as the measured yaw rate, a measured longitudinal acceleration, and/or a measured transverse acceleration, a significant improvement is possible in the recognition of an impact type. Here the fact is exploited that the signals used in the approach proposed here are provided by sensors for physical quantities that nowadays are already installed. At the same time, the entire mechanical energy realized during an earlier collision phase, in particular a combination of signals from translational and rotational movement components, is taken into account. In this way, a better distinguishing of different impact types is achieved using technically simple means.

It is also advantageous if, in the recognition step, the transverse signal is formed by a summation or integration over time from the difference between the lateral acceleration value and the acceleration value for an acceleration transverse to the longitudinal axis of the vehicle, and/or the longitudinal signal is formed by a summation or an integration over time from the difference between the longitudinal acceleration value and the and the acceleration value in the longitudinal direction of the vehicle. Such a specific embodiment of the present invention offers the advantage that a temporally longer-lasting signal is obtained, enabling a more precise prediction of the impact type.

According to a further specific embodiment of the present invention, in the determination step, the acceleration value for an acceleration transverse to the longitudinal axis of the vehicle and/or the acceleration value in the longitudinal direction of the vehicle can be determined on the basis of a known mass of the vehicle, a known moment of inertia of the vehicle, and/or a known (assumed) distance between a location of the impact of the object on the vehicle and the center of mass of the vehicle. These signals can for example also be acquired by measurement during commissioning of the vehicle. Such a specific embodiment of the present invention offers the advantage that vehicle-specific quantities and are taken into account in the determination of the impact type. In this way, a very precise determination can be achieved of the actually occurring impact type, using signal development patterns of previously defined impact types.

It is advantageous if, in the recognition step, a comparison of the transverse acceleration value or of the transverse signal derived therefrom with different first threshold values takes place, and/or a comparison of the longitudinal acceleration value or of the longitudinal signal derived therefrom with different second threshold values takes place, the different first threshold values being allocated to different predefined impact types, and/or the different second threshold values being allocated to different predefined impact types. Such a specific embodiment of the present invention offers the advantage of a technically simple possibility, such as one or more comparison operations, for quickly distinguishing different impact types from one another.

According to a further specific embodiment of the present invention, in the recognition step the predefined impact type can be recognized when the transverse acceleration value or the transverse signal derived therefrom is smaller than the first threshold value, and/or when the longitudinal acceleration value or the longitudinal signal derived therefrom is smaller than the second threshold value. Such a specific embodiment of the present invention offers the advantage that the first and/or second threshold value forms a maximum limit up to which the measured signals are assigned to the predefined impact type. In this way, it can be ensured that no impact type is recognized, and used for a subsequent triggering of a personal safety device in the vehicle, that cannot be reliably verified.

In addition, in order to ensure optimal safety for vehicle occupants, in response to the recognized impact type a step of activation of a predetermined personal protection device of a vehicle corresponding to a triggering rule predefined for the impact type may be provided if the transverse acceleration value or a transverse signal derived therefrom stands in a predetermined relation to a triggering threshold value, and/or if the longitudinal acceleration value or a longitudinal signal derived therefrom stands in a predetermined relation to a further triggering threshold value. Such a specific embodiment of the present invention offers the advantage that already-present signals may be multiply used, thus achieving large additional benefit with comparatively small additional outlay.

In addition, in many impact situations it is conceivable that for the recognition of one and the same impact type for example low values of the lateral acceleration can be compensated by larger values of the longitudinal acceleration without requiring false recognition of the impact type. For the classification of such an impact type, in this case in the recognition step a first threshold value and a second threshold value can be used by which a threshold plane is defined in a feature space, the feature space including as a dimension the transverse acceleration value or the transverse signal derived therefrom or the longitudinal acceleration value or the longitudinal signal derived therefrom.

DETAILED DESCRIPTION OF THE INVENTION

In the Figures, identical or similar elements may be provided with identical or similar reference characters, repeated description then being omitted. In addition, the Figures of the drawings, and the description thereof contain numerous features in combination. Here it will be clear to someone skilled in the art that these features may also be regarded individually, or combined to form further combinations not explicitly described herein. In addition, in the following description the present invention may be explained with reference to different measures and dimensions, but the present invention is not to be understood as being limited to these measures and dimensions. In addition, method steps according to the present invention may be repeated, and may be carried out in a sequence differing from that described. If an exemplary embodiment includes an "and/or" linkage between a first feature/step and a second feature/step, this may be read as meaning that the embodiment, according to one specific embodiment, has both the first feature/the first step and the second feature/the second step, and according to another specific embodiment has either only the first feature/step or only the second feature/step.

Figure 1:
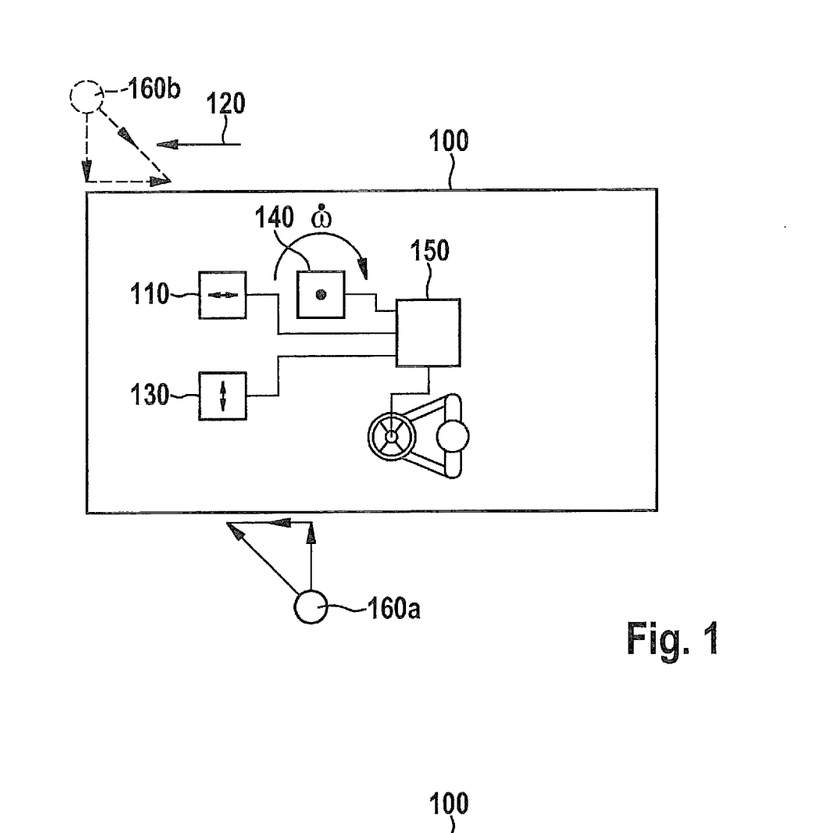
FIG. 1 shows a block diagram of a scenario of use of an exemplary embodiment of the present invention.

FIG. 1 shows a block diagram of a vehicle 100. Vehicle 100 has a first sensor 110 for acquiring for example an acceleration in a direction of travel 120 of vehicle 100. In addition, vehicle 100 has a second sensor 130 that is fashioned to acquire for example an acceleration transverse to direction of travel 120 of the vehicle. Vehicle 100 also has a third sensor 140 that is for example fashioned to acquire a rotational acceleration about a vertical axis of vehicle 100 that, in the representation shown in FIG. 1, runs perpendicular to the plane of the drawing. Sensors 110, 130, and 140 are connected to an evaluation unit 150 that has units that are fashioned in order to link or process the signals of sensors 110, 130, and 140 in a manner corresponding to the procedure described in more detail below. Using the described components, a type of the impact of an object 160 on vehicle 100 can be determined. If, for example, object 160a in the left front region laterally strikes vehicle 100, a different rotational behavior of vehicle 100 will result than in the case in which an object 160b in the front right region strikes the vehicle. These two different impact situations of the object on the vehicle thus form two different impact types that are to be recognized in order to determine an optimal triggering strategy for personal protective devices.

In order to enable unambiguous determination of an impact type, i.e. a collision situation of an object 160 with vehicle 100, use is made of particular patterns of rotation of vehicle 100 for predetermined or precalculated sample collisions. For these sample collisions, given a particular impact position or a particular impact angle of object 160 on vehicle 100, a particular rate of rotation, or rotational acceleration, is expected. In an actual impact situation, the actually occurring rate of rotation or rotational acceleration will be acquired by third sensor 140, which provides this acceleration to evaluation unit 150. At the same time, the impact of object 160 on vehicle 100, in particular in the case of an angled impact, will cause components of the impulse both in direction of travel 120 of the vehicle and transverse to direction of travel 120 of vehicle 100. These components in direction of travel 120 of vehicle 100, and transverse to direction of travel 120 of vehicle 100, can be acquired by first sensor 110 or by second sensor 130. The measurement results of first sensor 110 and of second sensor 130 are also conducted to evaluation unit 150. In evaluation unit 150, a longitudinal acceleration signal is now determined from the value measured by third sensor 140 (for example in connection with a known mass, a known torque of the vehicle, and/or an assumed distance between the impact point of the object on the vehicle) with the value measured by first sensor 110, for example through difference formation. In evaluation unit 150, a transverse acceleration signal is also determined the value measured by third sensor 140 with the value measured by second sensor 130, in particular through difference formation. Through this linkage of the value measured by third sensor 140 with the values measured by the first and/or second sensor, it can now very easily be checked whether an expected impact type is actually present or not. In particular, the longitudinal acceleration signal, or a value derived therefrom, can be compared to a first threshold value, and/or the transverse acceleration signal, or a value derived therefrom, can be compared to a second threshold value. If, for example, the named values are below the relevant threshold values, it can be assumed that the measured signals indicate the corresponding impact type to which the first and second threshold value are assigned.

For a very precise recognition of the impact type, it is therefore very helpful if, in addition to the transmission of rotational impulse (represented by the rotational rate $\omega$), the torque (described by the determinable quantity $\dot{\omega}$) is also taken into account. In fact, it is thus helpful to determine a linear function $F1(a, dv)$ and a rotational function $F2(\omega, \dot{\omega})$. In the simplest case, this consideration follows from an analysis of the linear or rotational power. In the approach presented here, the combination of rotational and linear movement therefore takes into account, in addition to the linear kinetic power, the rotational kinetic power as well.

Thus, in most cases the following two components are used in the determination of the impact type of an object on the vehicle:

the rotational rate ω as a function of the rotational acceleration $\dot{\omega}$, i.e. $\omega(\dot{\omega})$ the linear reduction in velocity dv as a function of acceleration a (dv(a))

On the one hand, with the approach presented here the "misuse" robustness (i.e., the robustness against false detections of an accident) can be improved, while on the other hand the duration of rotational and linear energies occurring in the crash can be better assessed. A "misuse," such as a hammer impact, in the linear case usually causes a high force (and therefore proportionally a high acceleration) with very low momentum transfer (dv). On the other hand, a braking causes a high momentum transfer (e.g. braking at a stoplight from 50 km/h to 0 km/h) with low acceleration (normally less than 1 g). In the "rotational case," turning into a fast curved path means a high momentum transfer with low torque, whereas a soccer ball hitting the fender laterally causes a high torque with low momentum transfer. The risk of injury to the occupants is sufficiently high only when there occur sufficient and long-lasting rotational momentum transfer and torque, or momentum transfer and force. From the combination of the linear signal portion and the rotational signal portion, the location of the introduction of force can be approximated.

The approach presented here has generally been used with regard to the evaluation of rotations in a crash. An important aspect of the present invention is the taking into account of rotational signal energy both in crashes carried out in crash tests and in real crashes. The advantages of the proposed invention can for example be seen in an improved controlling of the thorax airbag, because this need be triggered only in the case of intrusions. If it can be recognized that no intrusion has taken place, i.e. an impact type is present in which the vehicle has been impacted decentrally (i.e. not in the region of the passenger compartment), then for example the thorax bag can be suppressed and/or the window bag (side bag in the area of the window) can be fired.

In addition, an improved controlling of the window bag is enabled, because in various crash scenarios the use of this bag can be advantageous, because otherwise head injuries to the occupants can occur against the B-pillar or the side window. Up to now, such triggering scenarios have not been taken into account in the triggering algorithm for airbags.

In addition, the approach proposed here enables a taking into account of all the mechanical energy realized during an earlier crash phase. This enables a saving of sensor equipment (peripheral sensor equipment) with simultaneous new airbag functionality.

In the following, examples of the approach proposed here are explained in more detail.

The force initially introduced into the target vehicle during a crash usually has, if the crash is not central, a rotational and a translational portion. For the example of an "offset" crash (i.e., an impact of an object outside the area of the driver's compartment of the vehicle), it can be recognized that the initial force input does not run only in the x direction (i.e. the direction of travel of the vehicle). The acceleration in the y direction (i.e. transverse to the direction of travel), as well as the following rotation, result from the energy that was inputted into the vehicle in the x direction but at a distance from the center of mass of the vehicle.

Figure 2:
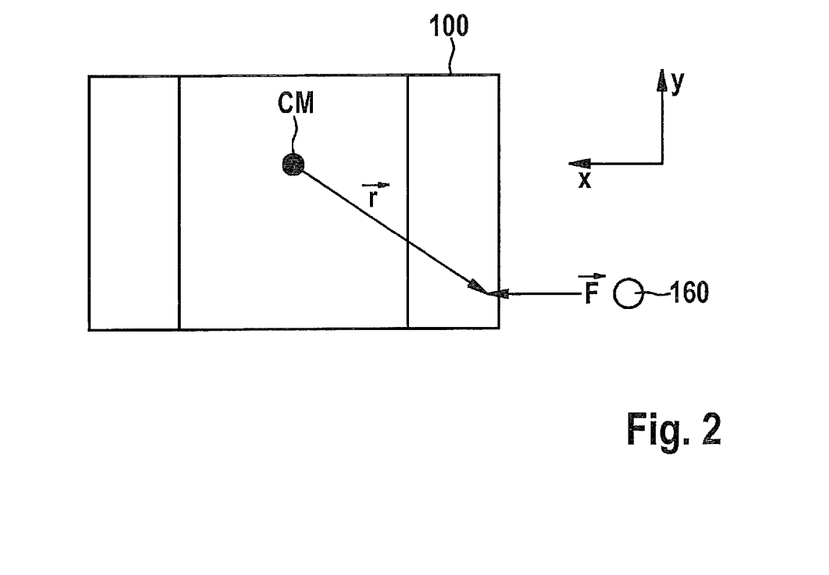
FIG. 2 shows a schematic representation of an angled impact of an object on the vehicle, the impact location being situated at a certain distance from the center of mass of the vehicle.

In angled crashes, the force vector has an x and y portion, as is shown schematically in FIG. 2 on the basis of a non-centric input of force into a vehicle. Here, the assumption has been made that only the y portion contributes to the rotation. Under the stated assumptions, the following conclusion can be derived:

$\omega_z$ can be calculated using known quantities of the vehicle geometry, as well as from the acceleration in the x direction and the y direction, or, conversely, using $\omega_z$ portions of the x direction and the y direction can be calculated that are responsible for the rotation or the linear movement and deformation.

Taking into account a distance r of the impact location relative to center of mass CM of the vehicle, torque T in the vehicle can be determined as follows:

$$\vec{T} = \vec{r} \times \vec{F};$$

if $\vec{F}$ is the only force acting on the vehicle, then Newton's Law $\vec{F} = m\vec{a}$ holds, with acceleration $\vec{a}$. The following also holds:

$$\dot{\vec{L}} = J\vec{\omega} \text{ and } \dot{\vec{L}} = \vec{T}$$

with L as variable of the rotational momentum and J as variable of the moment of inertia.

From the above relationships, there results $$m\vec{r} \times \vec{a} = J\dot{\vec{\omega}}.$$

With regard to the geometry of the vehicle in this case, or the introduction of force into the vehicle (e.g. force F in the (x, y) plane), the following holds:

$$m(r_x a_y - r_y a_x) = J_z \dot{\omega}_z.$$

If the introduced force F does not have a y component, the above equation simplifies to:

$$m(-r_y a_x) = J_z \dot{\omega}_z.$$

The same holds analogously if F does not have an x component (e.g. in the case of a pure side impact).

The above considerations are based on the assumption that the force F is the only force acting on the vehicle. In fact, in real crash situations additional forces act (e.g. frictional forces of the wheels, etc.). These additional forces and moments cause deviations from the above-stated equations.

In the following, the deviations between the actually measured accelerations and the "predicted" ones are taken into account. The idea on which the proposed approach is based is that the deviations are typical for the different crash types, and therefore enable a classification.

A rotational portion of accelerations Acc in the x and y direction can be determined as follows:

$$AccX_{Rot}, Y_{Rot} = k \cdot \dot{\omega}$$

with: $k = \dfrac{J_z}{m \cdot r}$ where the variable r represents the distance between the point of entry of force into the vehicle and the center of mass (CM). Here, sample crash data are assumed for different impact types, such as a prespecified assumed mass m of the vehicle, a moment of inertia, assumed due to the impact of the object, $J_z$ about the z axis of the vehicle (vertical vehicle axis), and/or an assumed distance r of the impact location to center of mass CM. From this, there results for example for the acceleration values in the y direction of the vehicle:

$$AccY_{measured} = AccY_{Rot} + AccY_{Trans}$$

$$DvY_{Trans} = \int (AccY_{measured} - AccY_{Rot})$$

where $AccY_{measured}$ represents the resulting lateral acceleration that is to be measured, measured by second sensor 130, $AccY_{Rot}$ represents the overall rotational acceleration of the vehicle (with the portion in the y direction), determined by yaw acceleration sensor 140, and $AccY_{Trans}$ represents the resulting acceleration in the y direction, which occurs due to the action of additional forces in real accident scenarios, and which should be as small as possible for unambiguous classification.

In the present case the following holds: $\int = \Sigma$, the summation or integration being carried out over time. If the obtained (and for example determined over a particular time span) quantity does not essentially deviate from the "predetermined" quantity (i.e., the deviation is not greater than a threshold value specific to the impact type), it can be assumed that the impact type assigned to the threshold value is present. By taking into account a longer time span, a more reliable classification of the impact type can be achieved than is possible by regarding signal values only at selected points in time.

Analogously, the following holds for the acceleration values in the x direction of the vehicle, on the basis of the following equation:

$$AccX_{measured} = AccX_{Rot} + AccX_{Trans}$$

$$DvX_{Trans} = \int (AccX_{measured} - AccX_{Rot})$$

where $AccX_{measured}$ represents the measured longitudinal acceleration that was measured by first sensor 110, $AccX_{Rot}$ represents the overall rotational acceleration of the vehicle (with the portion in the x direction) that was determined by yaw acceleration sensor 140, and $AccX_{Trans}$ represents the resulting acceleration in the x direction, which occurs due to the action of additional forces in real accident scenarios, and which should be as small as possible for unambiguous classification.

In the present case, $\int = \Sigma$ again holds, the summation or integration being carried out over time. If the obtained (and for example determined over a particular time span) quantity does not essentially deviate from the "predetermined" quantity (i.e., the deviation is not greater than a threshold value specific to the impact type), it can be assumed that the impact type assigned to the threshold value is present.

It is also advantageous if both conditions for the x and y directions are fulfilled, because in this case an unambiguous recognition of the relevant impact type can be improved on the basis of the first and second threshold value. Here care is to be taken that the first and second threshold value are assigned to a single impact type.

In particular, here the following assumption can be made: that the measured accelerations signals in the x and y direction each reproduce the sum of all accelerations in the respective direction. With the aid of $\omega_z$, it is now attempted to calculate the actual acceleration, the acceleration responsible for the deformation, etc. There then results the acceleration portion, which is responsible for a rotation of the vehicle that may be present.

Figure 3:
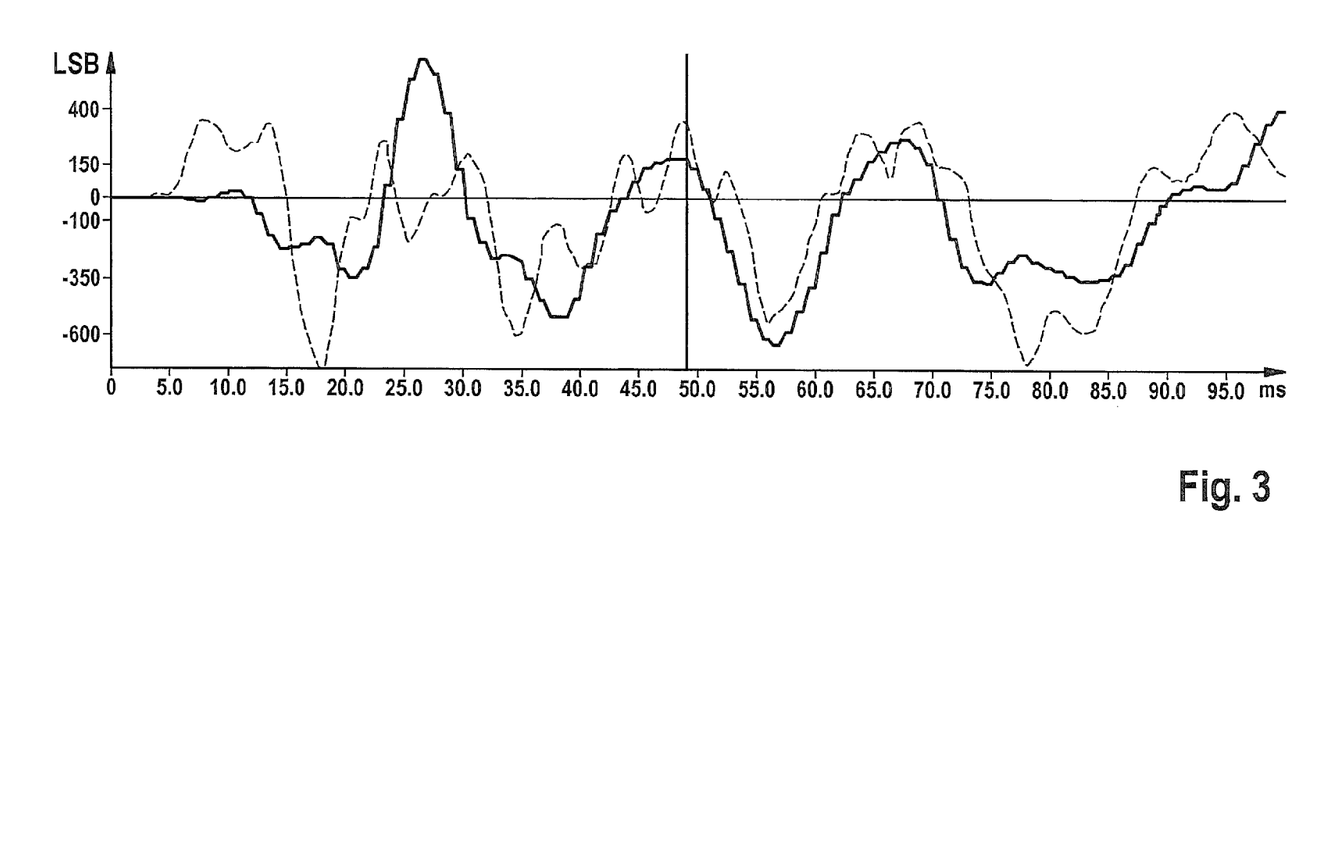
FIG. 3 shows a diagram of an exemplary embodiment of the present invention in which a yaw acceleration for a particular impact type is expected, and this expected acceleration is compared to an actually measured yaw acceleration in order to determine the actually occurring impact type.

FIG. 3 shows a diagram of a temporal development of a calculated yaw acceleration (solid line) and of a measured yaw acceleration (dashed line) in an impact situation. If the deviation of the two lines is not greater than a predetermined value (i.e. is smaller than a threshold value), it can be assumed that the impact type is actually present to which the calculated yaw acceleration is assigned, in the form of the depicted solid line. In FIG. 3 it can be seen that the measured line approximately follows the curve of the solid line, so that it is then also possible, from the measured curve of the yaw acceleration, to infer the actually occurring accident scenario (i.e. the actually occurring impact type). Analogously, it is also possible to infer the actually occurring accident situation if the accelerations in the x and/or y direction of the vehicle are evaluated in a corresponding manner using a threshold value.

In order to make it possible to distinguish a plurality of impact types from one another, the above-described evaluation can be carried out using different first and/or second threshold values. In this case, each of the individual first and/or second threshold values is assigned to a particular impact type. Through the comparison of the obtained result with the first and/or second threshold values assigned to the different impact types, it is then possible, using the associated first and second threshold values, to determine the impact type whose expected result signal deviates the least from the measured signal. Thus, with the aid of FIG. 3, it can be seen that by matching the calculated yaw acceleration to one crash type (i.e. through the selection of an impact type with the associated first and/or second threshold value), it is possible to distinguish this crash type from other crash types.

Figure 4:
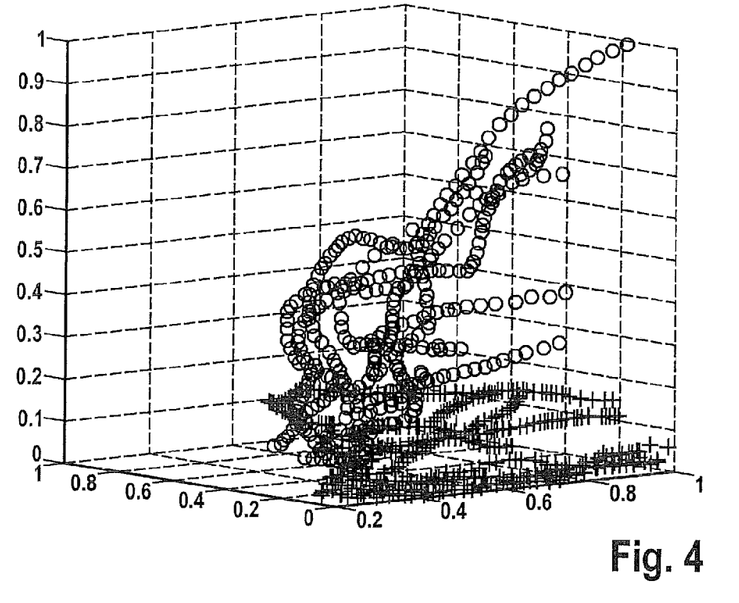
FIG. 4 shows a multidimensional diagram that represents a triggering criterion for triggering a personal protective device of a vehicle, using a quantity determined via the present approach.

If, through the above-described procedure, a specific impact type has been recognized, this knowledge can then be used to trigger personal protective devices in the vehicle (for example a front or side airbag). For example, in the determination of the impact type it can be recognized that an off-zone impact has taken place, i.e. an impact of the object against the vehicle in front of or behind the area of the passenger compartment. In this case, it is to be assumed that as the vehicle continues to move in a manner affected by the impact, a strong rotation of the vehicle will take place. In such a situation, it is usually more advantageous to activate a side airbag than to activate the front airbag, in order to avoid injury to the head of a vehicle occupant against the B-pillar of the vehicle. If such an impact type is recognized, for example requiring an activation of the side airbag, the relevant safety device can for example be triggered when certain signal values exceed a triggering threshold value. The representation shown in FIG. 4 shows such an approach for classification between a triggering situation ("fire" situation, shown as a circle in FIG. 4) and a non-triggering situation ("no fire" situation, shown as a cross in FIG. 4) for an accident situation. Here, a multidimensional feature space (in the present case, a three-dimensional feature space) is used that is spanned by the previously determined signals, the determined signals being derived from the longitudinal acceleration signal, the transverse acceleration signal, and/or the rotational acceleration signal. In particular, the feature space is for example spanned by the signals (described above in more detail) $DvY_{Rot}$, $Dv$ (change in vehicle speed in the x direction), and $DvY_{Lat}$ (where $DvY_{Lat} = DvY_{Lat}$). As can be seen from the identifiers of the triggering situations shown in FIG. 4, a general classification into a triggering situation of a protective device and a non-triggering situation of the protective device can be defined by a virtual dividing plane (not shown in FIG. 4) in the feature space. If the restraints, or in general a protective device, are to be triggered in the vehicle (such as the side airbag), then, in the case of an accident, a value tuple is reached in the feature space that is situated above the dividing plane.

Figure 5:
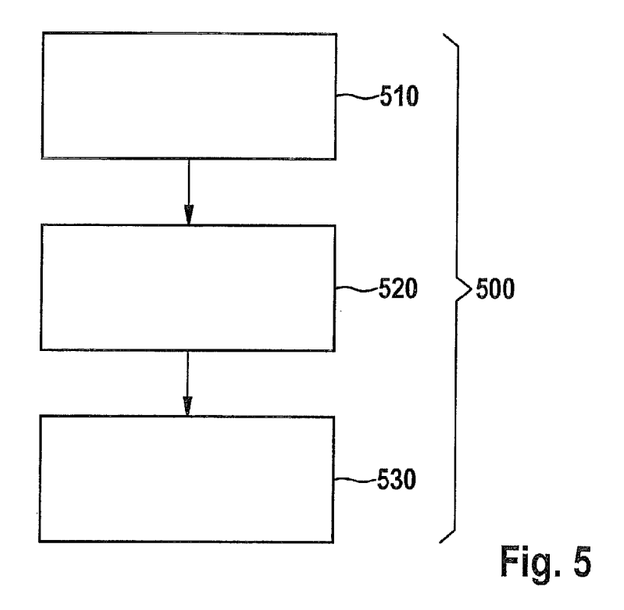
FIG. 5 shows a flow diagram of an exemplary embodiment of the present invention as a method.

In addition, the present invention creates a method 500 for determining a type of impact of an object on a vehicle, as shown as a flow diagram in FIG. 5. Method 500 includes a step 510 of reading in a rotational acceleration value, representing an acceleration of the vehicle about a vertical axis of the vehicle, of a longitudinal acceleration value of the vehicle, representing an acceleration in the direction of the longitudinal axis of the vehicle, and/or of a lateral acceleration value of the vehicle, representing an acceleration in the direction transverse to the longitudinal axis of the vehicle. In addition, method 500 includes a step 520 of determination of a transverse acceleration value, representing a difference between the lateral acceleration value and an acceleration value, based on the rotational acceleration value, for an acceleration transverse to the longitudinal axis of the vehicle, and/or of the determination of a longitudinal acceleration value, representing a difference between the longitudinal acceleration value and an acceleration value, based on the rotational acceleration value, in the longitudinal direction of the vehicle. Finally, method 500 includes a step 530 of recognition of the type of impact, if the transverse acceleration value or a transverse signal derived therefrom stands in a predetermined relation to a first threshold value, and/or if the longitudinal acceleration value or a longitudinal signal derived therefrom stands in a predetermined relation to a second threshold value.

What is claimed is:

1. A method for determining a type of an impact of an object on a vehicle, comprising:
   reading in at least one of: a rotational acceleration value representing an acceleration of the vehicle about a vertical axis of the vehicle; a longitudinal acceleration value of the vehicle representing an acceleration in the direction of the longitudinal axis of the vehicle; and a lateral acceleration value of the vehicle representing an acceleration in the direction transverse to the longitudinal axis of the vehicle;
   determining at least one of: a transverse acceleration difference value representing a difference between (i) the lateral acceleration value and (ii) an acceleration value based on the rotational acceleration value and representing an acceleration transverse to the longitudinal axis of the vehicle; and a longitudinal acceleration difference value representing a difference between (iii) the longitudinal acceleration value and (iv) an acceleration value based on the rotational acceleration value and representing an acceleration in the longitudinal direction of the vehicle;
   identifying the type of the impact, depending on at least one of: (a) one of the transverse acceleration difference value or a transverse signal derived from the transverse acceleration difference value stands in a predetermined relation to at least one first threshold value; and (b) one of the longitudinal acceleration difference value or a longitudinal signal derived from the longitudinal acceleration difference value stands in a predetermined relation to at least one second threshold value; and
   activating, in response to the identified type of impact, a predetermined passenger protective device of the vehicle depending on at least one of: (a) one of the transverse acceleration difference value or the transverse signal derived from the transverse acceleration difference value stands in a predetermined relation to a first activation threshold value; and (b) one of the longitudinal acceleration difference value or the longitudinal signal derived from the longitudinal acceleration difference value stands in a predetermined relation to a second triggering threshold value.

2. The method as recited in claim 1, wherein in the identifying of the type of the impact, at least one of:
   (i) the transverse signal is formed by one of a summation or integration over time from the difference between the lateral acceleration value and the acceleration value based on the rotational acceleration value and representing an acceleration transverse to the longitudinal axis of the vehicle, and
   (ii) the longitudinal signal is formed by one of a summation or an integration over time from the difference between the longitudinal acceleration value and the acceleration value based on the rotational acceleration value and representing an acceleration in the longitudinal direction of the vehicle.

3. The method as recited in claim 1, wherein in the step of determining the at least one of the transverse acceleration value and the longitudinal acceleration value, the longitudinal acceleration value is determined on the basis of at least one of a mass of the vehicle, a moment of inertia of the vehicle, and a distance between a location of the impact of the object on the vehicle and the center of mass of the vehicle.

4. The method as recited in claim 1, wherein in the step of identifying the type of the impact, at least one of: (a) one of the transverse acceleration value or the transverse signal derived from the transverse acceleration value is compared to multiple, different first threshold values assigned to different predefined impact types; and (b) one of the longitudinal acceleration value or the longitudinal signal derived from the longitudinal acceleration value is compared to multiple, different second threshold values assigned to different predefined impact types.

5. The method as recited in claim 1, wherein in the identifying of the type of the impact, a predefined impact type is identified based on at least one of: (a) one of the transverse acceleration value or the transverse signal derived from the transverse acceleration value is smaller than the first threshold value; and (b) one of the longitudinal acceleration value or the longitudinal signal derived from the longitudinal acceleration value is smaller than the second threshold value.

6. The method as recited in claim 5, wherein in the activating of the predetermined passenger protective device, the first and second triggering threshold values define a threshold plane in a feature space, and wherein the feature space includes as a dimension at least one of: (a) one of the transverse acceleration value or the transverse signal derived from the transverse acceleration value; and (b) one of the longitudinal acceleration value or the longitudinal signal derived from the longitudinal acceleration value.

7. The method as recited in claim 1, wherein in the identifying of the type of the impact, a deviation is determined between at least one of the longitudinal acceleration difference value and the transverse acceleration difference value, and at least one predicted acceleration value.

8. The method as recited in claim 1, wherein in the identifying of the type of impact, a torque of the vehicle is also taken into account.

9. The method as recited in claim 1, wherein at least one of the transverse signal derived from the transverse acceleration difference value and the longitudinal signal derived from the longitudinal acceleration difference value is a velocity value.

10. A device for determining a type of an impact of an object on a vehicle, comprising:
    an interface configured for reading in at least one of: a rotational acceleration value representing an acceleration of the vehicle about a vertical axis of the vehicle; a longitudinal acceleration value of the vehicle representing an acceleration in the direction of the longitudinal axis of the vehicle; and a lateral acceleration value of the vehicle representing an acceleration in the direction transverse to the longitudinal axis of the vehicle; and a determination unit configured for:

determining at least one of: a transverse acceleration difference value representing a difference between (i) the lateral acceleration value and (ii) an acceleration value based on the rotational acceleration value and representing an acceleration transverse to the longitudinal axis of the vehicle; and a longitudinal acceleration difference value representing a difference between (iii) the longitudinal acceleration value and (iv) an acceleration value based on the rotational acceleration value and representing an acceleration in the longitudinal direction of the vehicle;

identifying the type of the impact, depending on at least one of: (a) one of the transverse acceleration difference value or a transverse signal derived from the transverse acceleration difference value stands in a predetermined relation to a first threshold value; and (b) one of the longitudinal acceleration difference value or a longitudinal signal derived from the longitudinal acceleration difference value stands in a predetermined relation to a second threshold value; and activating, in response to the identified type of impact, a predetermined passenger protective device of the vehicle depending on at least one of: (a) one of the transverse acceleration difference value or the transverse signal derived from the transverse acceleration difference value stands in a predetermined relation to a first activation threshold value; and (b) one of the longitudinal acceleration difference value or the longitudinal signal derived from the longitudinal acceleration difference value stands in a predetermined relation to a second triggering threshold value.

11. A non-transitory computer-readable data storage medium storing a computer program having program codes which, when executed on a computer, perform a method for determining a type of an impact of an object on a vehicle, the method comprising:

reading in at least one of: a rotational acceleration value representing an acceleration of the vehicle about a vertical axis of the vehicle; a longitudinal acceleration value of the vehicle representing an acceleration in the direction of the longitudinal axis of the vehicle; and a lateral acceleration value of the vehicle representing an acceleration in the direction transverse to the longitudinal axis of the vehicle;

determining at least one of: a transverse acceleration difference value representing a difference between (i) the lateral acceleration value and (ii) an acceleration value based on the rotational acceleration value and representing an acceleration transverse to the longitudinal axis of the vehicle; and a longitudinal acceleration difference value representing a difference between (iii) the longitudinal acceleration value and (iv) an acceleration value based on the rotational acceleration value and representing an acceleration in the longitudinal direction of the vehicle;

identifying the type of the impact, depending on at least one of: (a) one of the transverse acceleration difference value or a transverse signal derived from the transverse acceleration difference value stands in a predetermined relation to a first threshold value; and (b) one of the longitudinal acceleration difference value or a longitudinal signal derived from the longitudinal acceleration difference value stands in a predetermined relation to a second threshold value; and activating, in response to the identified type of impact, a predetermined passenger protective device of the vehicle depending on at least one of: (a) one of the transverse acceleration difference value or the transverse signal derived from the transverse acceleration difference value stands in a predetermined relation to a first activation threshold value; and (b) one of the longitudinal acceleration difference value or the longitudinal signal derived from the longitudinal acceleration difference value stands in a predetermined relation to a second triggering threshold value.

\* \* \* \* \*